United States Patent
Liland (10) Patent No.: US 9,938,087 B2
(45) Date of Patent: Apr. 10, 2018

(54) CONVEYOR TAIL SYSTEM

(71) Applicant: David K. Liland, New Bern, NC (US)

(72) Inventor: David K. Liland, New Bern, NC (US)

(*) Notice: Subject to any disclaimer, the term of this patent is extended or adjusted under 35 U.S.C. 154(b) by 0 days.

(21) Appl. No.: 15/449,507

(22) Filed: Mar. 3, 2017

(65) Prior Publication Data

US 2017/0253435 A1    Sep. 7, 2017

Related U.S. Application Data

(60) Provisional application No. 62/303,257, filed on Mar. 3, 2016.

(51) Int. Cl.
  *B65G 21/20*   (2006.01)
  *B65G 15/08*   (2006.01)
  *B65G 47/18*   (2006.01)

(52) U.S. Cl.
  CPC ......... *B65G 21/2063* (2013.01); *B65G 15/08* (2013.01); *B65G 47/18* (2013.01)

(58) Field of Classification Search
  CPC .... B65G 11/026; B65G 11/206; B65G 15/08; B65G 21/2063; B65G 21/2081; B65G 45/12; B65G 47/18; B65G 47/19; B65G 47/58; B65G 2207/48
  See application file for complete search history.

(56) References Cited

U.S. PATENT DOCUMENTS

| | | | | | |
|---|---|---|---|---|---|
| 3,399,466 | A | * | 9/1968 | Hartley | B65D 88/744 198/525 |
| 4,236,628 | A | * | 12/1980 | Stahura | B65G 21/2081 198/525 |
| 4,650,067 | A | * | 3/1987 | Brule | B65G 21/06 198/816 |
| 4,874,082 | A | * | 10/1989 | Swinderman | B65G 21/2081 198/836.1 |
| 4,989,727 | A | * | 2/1991 | Gordon | B65G 21/2081 198/525 |
| 6,328,156 | B1 | * | 12/2001 | Ostman | B65G 21/2081 198/525 |
| 7,712,715 | B2 | * | 5/2010 | Gibbs | B65G 21/2081 248/229.12 |
| 8,172,076 | B2 | * | 5/2012 | Brody | B65G 21/2081 198/836.1 |
| 8,800,756 | B2 | * | 8/2014 | Pircon | B65G 11/166 198/836.1 |

FOREIGN PATENT DOCUMENTS

JP    3915018 B2 *  5/2007  ......... B65G 21/2081

* cited by examiner

*Primary Examiner* — Leslie A Nicholson, III
*Assistant Examiner* — Keith R Campbell
(74) *Attorney, Agent, or Firm* — NK Patent Law, PLLC (57) ABSTRACT

A conveyor tail system positioned proximal a chute of a conveyor belt which includes a clamp assembly having a support plate for securing the conveyor tail system to the chute and a compression plate for selective coupling with the support plate. The conveyor tail system further includes a seal for creating a barrier between the clamp assembly and the conveyor belt. The seal defines a runner portion for extending along the conveyor belt, and a sealing portion selectively engageable between the support and a clamp portion defined by the compression plate.

20 Claims, 8 Drawing Sheets

CONVEYOR TAIL SYSTEM

TECHNICAL FIELD

This disclosure is related to a conveyor tail system for minimizing back spillage from a tail end of a conveyor belt, and more particularly a conveyor tail system having a clamp assembly and a seal for creating a barrier above the conveyor belt.

BACKGROUND

The loading of conveyor belts often results in portions of the load spilling off the rails and tail of the conveyor system. Any material lost during loading results in reduced efficiency and profitability. In vertically loaded conveyor belts involving vertical chutes, the loss of material through the tail end of the conveyor belt is particularly a problem. The downward forces caused by the vertical loading pushes the load materials in every direction. Past systems have attempted to solve this problem by installing large tail boxes on the tail end of the vertical chute and are designed to capture any 'dust up' or back spillage from the conveyor belt load.

Not only are the tail boxes large and expensive, but the tail seals used by such boxes often have unique problems themselves. For example, many seals create a harmonic with the moving conveyor belt, which can result in material being trapped under the seal and eventually pushed out the tail end of the conveyor system. In an attempt to reduce such back spillage many seals are engaged tightly against the conveyor belt, which results in an undesired 'cleaning' of the belt. This 'cleaning' causes additional wear on the belt and results in a build-up of material at the point where the conveyor belt enters the tail box.

Accordingly, there is a need for an improved conveyor tail system that not only provides for minimized spillage in the tail end of a conveyor belt, but also addresses the disadvantages associated with the tail boxes and tail seals of the prior art.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to at least one embodiment, a conveyor tail system is provided. The conveyor tail system includes a seal defining a runner portion and a sealing portion. The runner portion extends along the conveyor belt and defines a distal end capable of engagement with the conveyor belt and a proximal end positioned a distance above the conveyor belt. The sealing portion is positioned at an obtuse angle relative to the runner portion and defines at least one triangular gap for allowing the seal to be shaped in conformance to a bend and/or a trough angle of the conveyor belt. The sealing portion is selectively engageable with a clamp assembly positioned above the conveyor belt.

According to some embodiments, the sealing portion defines a front half defining at least one triangular front gap and a rear half defining at least one triangular rear gap. The sealing portion forms a gapless barrier when engaged with a clamp assembly and when shaped in conformance to a bend and/or a trough angle of the conveyor belt.

According to some embodiments, the conveyor tail system further includes a clamp assembly having a support plate defining an arcuate edge facing the conveyor belt for securing the seal in position above the conveyor belt. Further, the conveyor tail system includes a compression plate defining at least one access hole therethrough for maneuvering the compression plate and/or the seal. The sealing portion of the seal is selectively engageable between the support plate and teeth of a clamp portion defined by a bottom side of the compression plate. The compression plate defines a spacer portion extending therefrom for engaging the support plate when the sealing portion is selectively engaged.

According to some embodiments, the support plate includes fasteners extending therefrom for selective engagement with apertures defined by the compression plate According to some embodiments, the clamp portion is shaped to conform to the shape of the support plate.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies.

Figure 1:
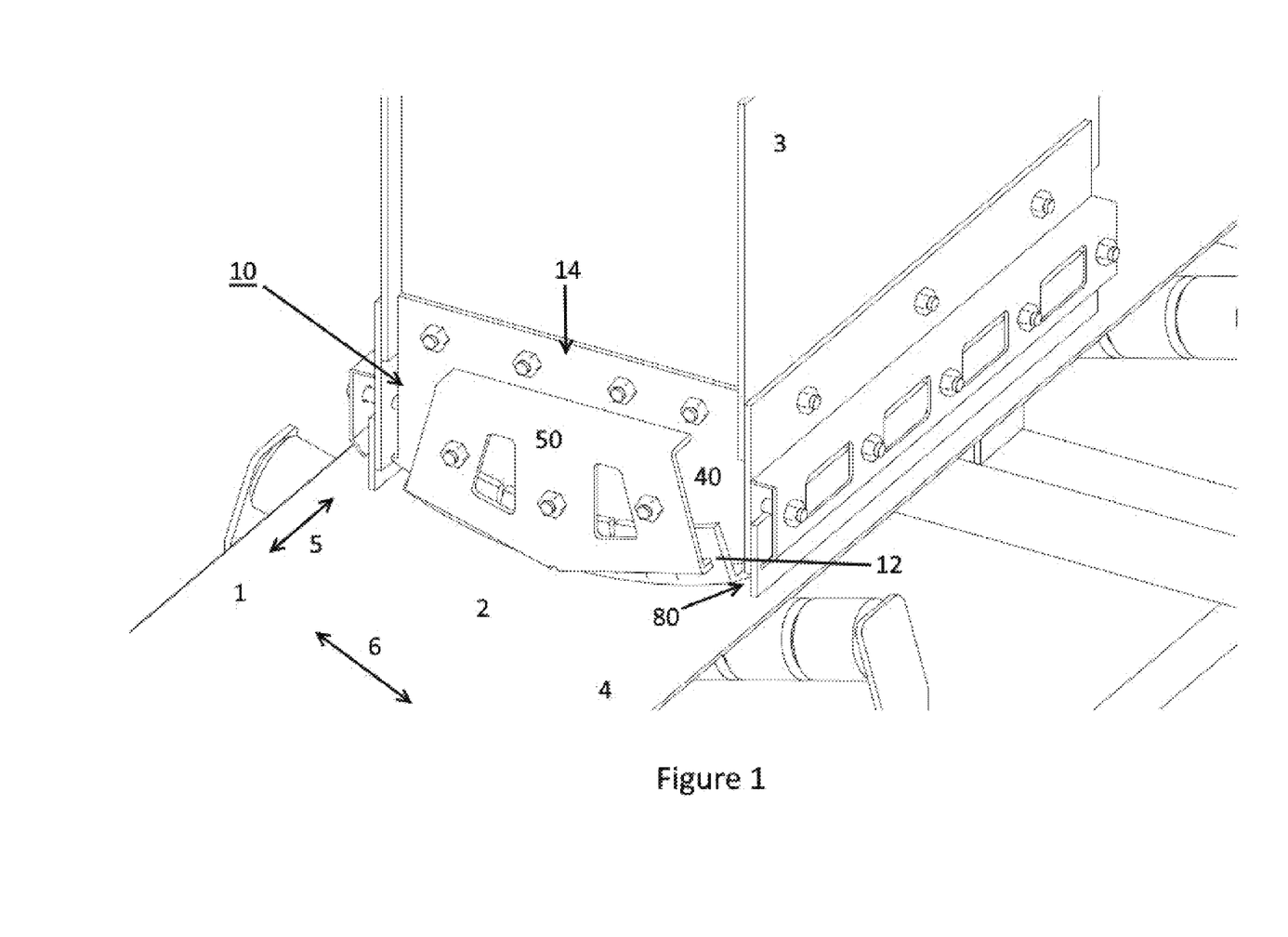
FIG. 1 illustrates a conveyor tail system secured to a vertical chute above a conveyor belt according to one or more embodiments disclosed herein.

FIG. 1 illustrates at least one embodiment of a conveyor tail system 10 for minimizing spillage from a conveyor belt 1. The tail system 10 may include a seal 12, a clamp assembly 14 or both. In some embodiments, the clamp assembly 14 may be made of a durable material, such as metal, and the seal 12 may be made of an elastomeric material, such as polyurethane. Generally, the seal 12 and/or clamp assembly 14 may be positioned above the conveyor belt 1 at or near a portion of the conveyor belt 1 where a load is being delivered. For example, as depicted in FIG. 1, the seal 12 and/or clamp assembly 14 may be secured or selectively engaged to a vertical chute 3 positioned above a conveyor belt 1. In some embodiments, the conveyor tail system 10 may include a clamp assembly 14 secured above a conveyor belt 1 and selectively engaged with a seal 12 for minimizing spillage from a tail portion 4 of a conveyor belt 1.

Figure 2:
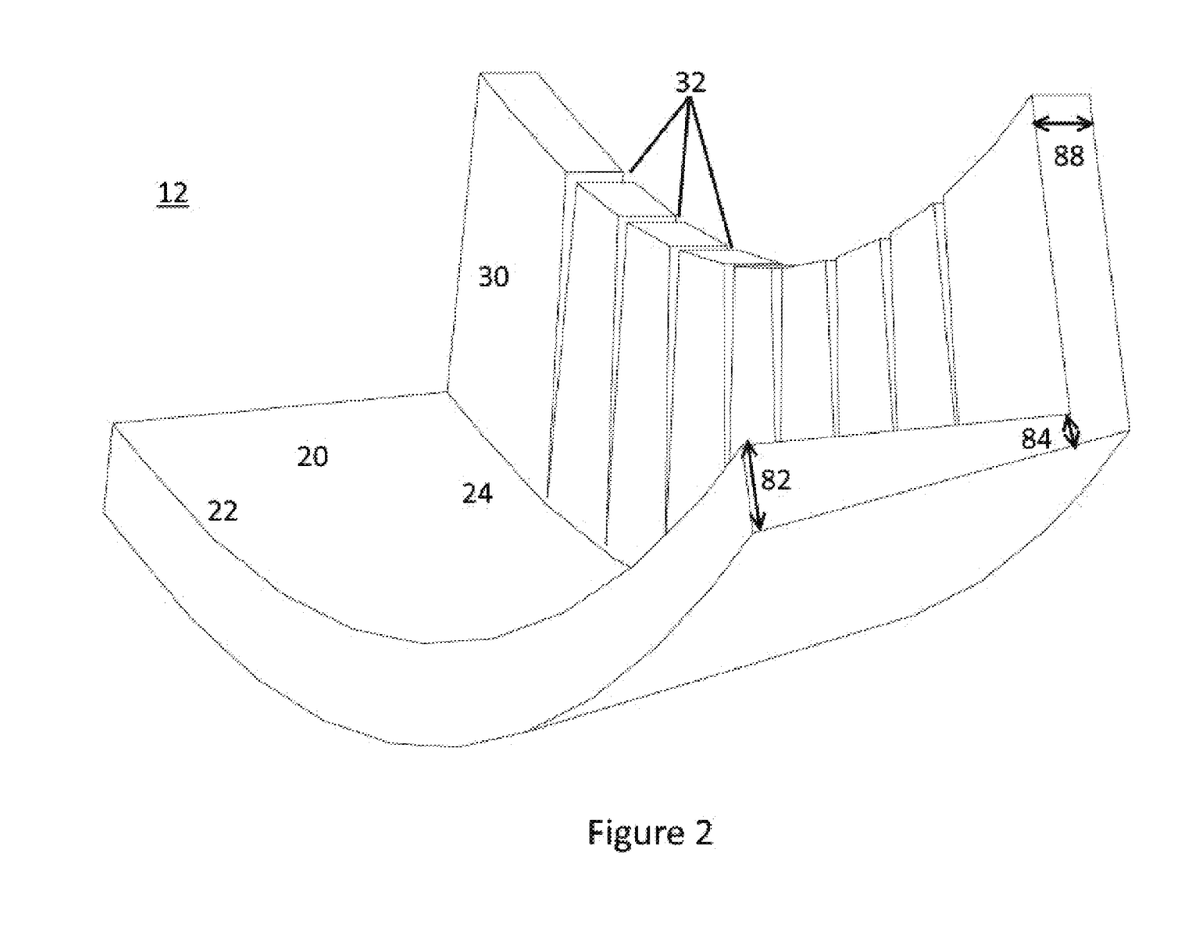
FIG. 2 illustrates a perspective view of a seal having a sealing portion and a runner portion according to one or more embodiments disclosed herein.
Figure 3:
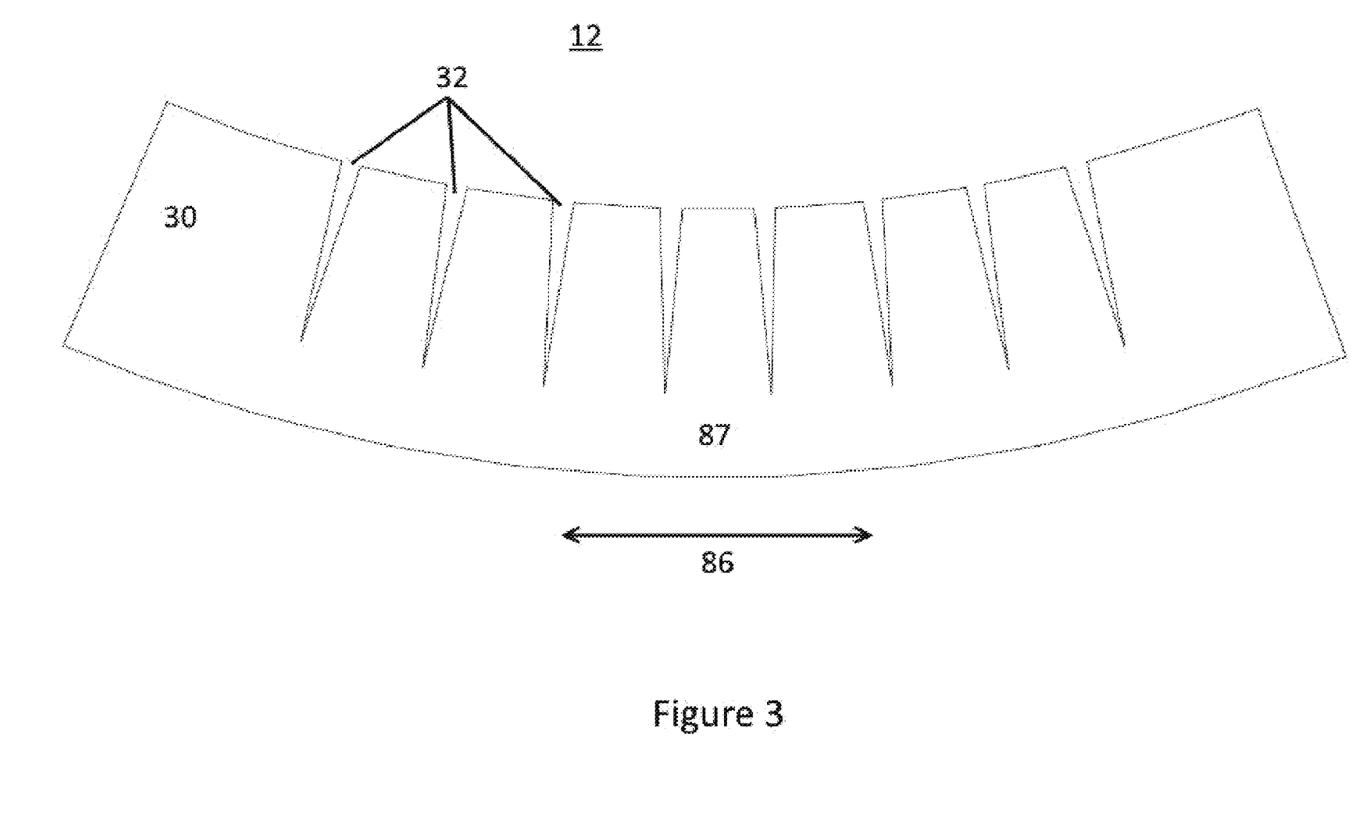
FIG. 3 illustrates a front view of a seal having triangular gaps according to one or more embodiments disclosed herein.

Turning to FIG. 2, the seal 12 may include a runner portion 20 and a sealing portion 30. The seal 12 may span at least a width 86 equal to or greater than a width 6 of the conveyor belt 1 for creating a barrier above the conveyor belt 1. In some embodiments, the seal may span a width 86 less than the width 6 of the conveyor belt 1. The runner portion 20 and the sealing portion 30 may be integrally formed or may be secured to each other. Further, the sealing portion 30 may be positioned at an angle relative to the runner portion 20. For example, the angle may be an obtuse angle (FIG. 3). Alternatively, the sealing portion 30 and runner portion 20 may be shaped to form a rounded curve (instead of an angle) or an angle having a rounded edge.

As is depicted in FIG. 1, the runner portion 20 of the seal may be positioned to extend along a length 5 of the conveyor belt 1. The runner portion 20 may define a distal end 22 furthest from the sealing portion 30 and define a proximal end closest to the sealing portion 30. In some embodiments, when the runner portion 20 extends along the conveyor belt 1, the distal end 22 may be capable of engagement with the conveyor belt 1 and a proximal end 24 may be positioned a distance 80 above the conveyor belt 1. In at least one embodiment, a thickness 82 of the distal end 22 of the runner portion 20 is greater than a thickness 84 of the proximal end 24 of the runner portion 20.

The placements and shapes of the runner portion 20 with respect to the conveyor belt 1 has numerous advantages. The conveyor belt 1, which conveys from proximal end 24 to distal end 22 beneath the runner portion 20, permits material on the conveyor belt 1 to travel beneath the proximal end 24 of the seal 12, within the distance 80 provided, and eventually travel beneath the distal end 22 of the seal 12 as well. The distance 80 between the proximal end 24 of the seal 12 and the conveyor belt 1 also prevents 'cleaning' of the conveyor belt 1, which is not desirable as it typically results in loss of load material and additional wear on the conveyor belt 1. Even though the distal end 22 may be capable of engagement with the conveyor belt 1, and may be engaged for a substantial portion of the time the conveyor belt 1 is in operation, the 'cleaning' of the conveyor belt 1 is prevented due to the ability of the runner portion 20 to capture (and/or recapture) material between the distal end 22 and proximal end 24 and permit such material to travel past the distal end 22 on onward down the length 5 of the conveyor belt 1. Notably, unlike some tail seals of the prior art, a harmonic between the seal 12 and the conveyor belt 1 is not created, thereby minimizing the ability of material to spill from the tail 4 of the conveyor belt 1. Further, the distance 80 and/or the elastomeric nature of the seal 12 itself minimizes the chance that the seal 12 is knocked out of position when a splice in the conveyor belt 1 passes beneath the seal 12.

FIG. 3 illustrates a seal 12 having a sealing portion 30 defining at least one gap 32 for permitting the seal 12 to conform to a bend and/or a trough angle 2 of the conveyor belt 1 according to at least one embodiment of the invention. The at least one gap 32 may be triangular and may be shaped like an isosceles triangle having an acute vertex angle, where the vertex angle is the angle of the triangle most proximal to the runner portion 20. The sealing portion 30 of the seal 12 may be selectively engageable with a clamp assembly 14 positioned above the conveyor belt 1. For example, as seen in FIG. 3, the sealing portion 30 may define several gaps 32 and the gaps may be closed when the seal 12 is bent along the width 86 of the seal 12 for conforming to the shape of the belt 1. In some embodiments, the sealing portion 30 may define at least two triangular gaps 32 positioned symmetrically about a center 87 of the sealing portion 30 for permitting the seal 12 to conform to a bend and/or trough angle 2 of the conveyor belt 1.

Figure 4:
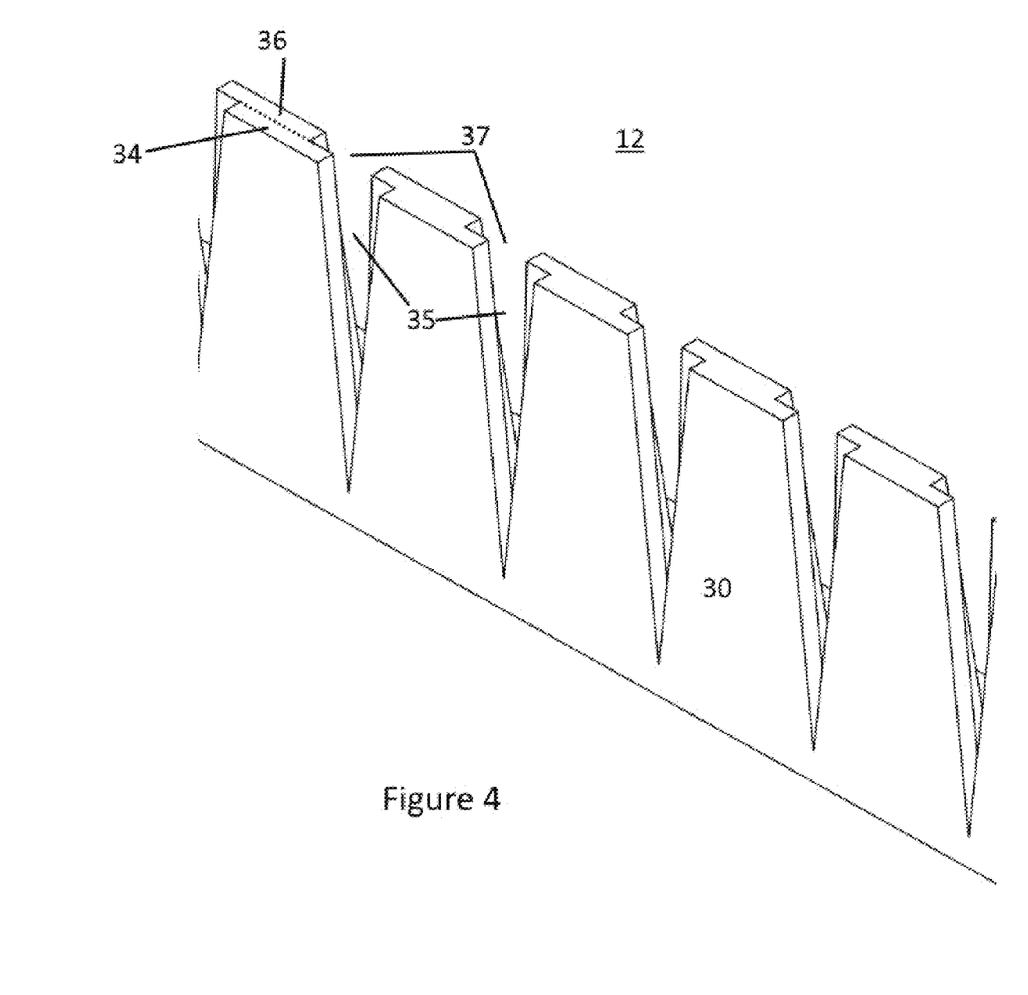
FIG. 4 illustrates a perspective view of a seal having front and rear gaps according to one or more embodiments disclosed herein.

As depicted in FIG. 4, the sealing portion 30 may define a front half 34 defining at least one triangular front gap 35 and at least one triangular rear gap 37 defined by a rear half 36 of the sealing portion 30. Each front gap 35 may be associated with a corresponding rear gap 37 where the gaps do not overlap, yet have coextensive vertex angles. The sealing portion 30 may therefore form a gapless barrier when engaged with a clamp assembly 14 and when shaped in conformance to a bend and/or a trough angle 2 of the conveyor belt 1. In some embodiments, the corresponding front and rear gaps 35, 37 may be triangles both having coextension vertex angles at approximately the same point along the width 86 of the seal 12; such a configuration would permit one gap (e.g., 35) to have two triangular sides extending from the vertex angle on one side of the seal's width (the third side being the top edge of the sealing portion 30) and would permit the other gap (e.g., 37) to have two triangular sides extending from a coextensive vertex angle on an opposing side of the seal's width. Stated another way, the front half 34 and the rear half 36 would have corresponding front and rear gaps 35, 37 that would form a barrier being gapless therethrough—at no point along the width 86 of the seal 12 would there be a gap or passageway that extends through the entire thickness 88 of the seal 12.

Figure 8:
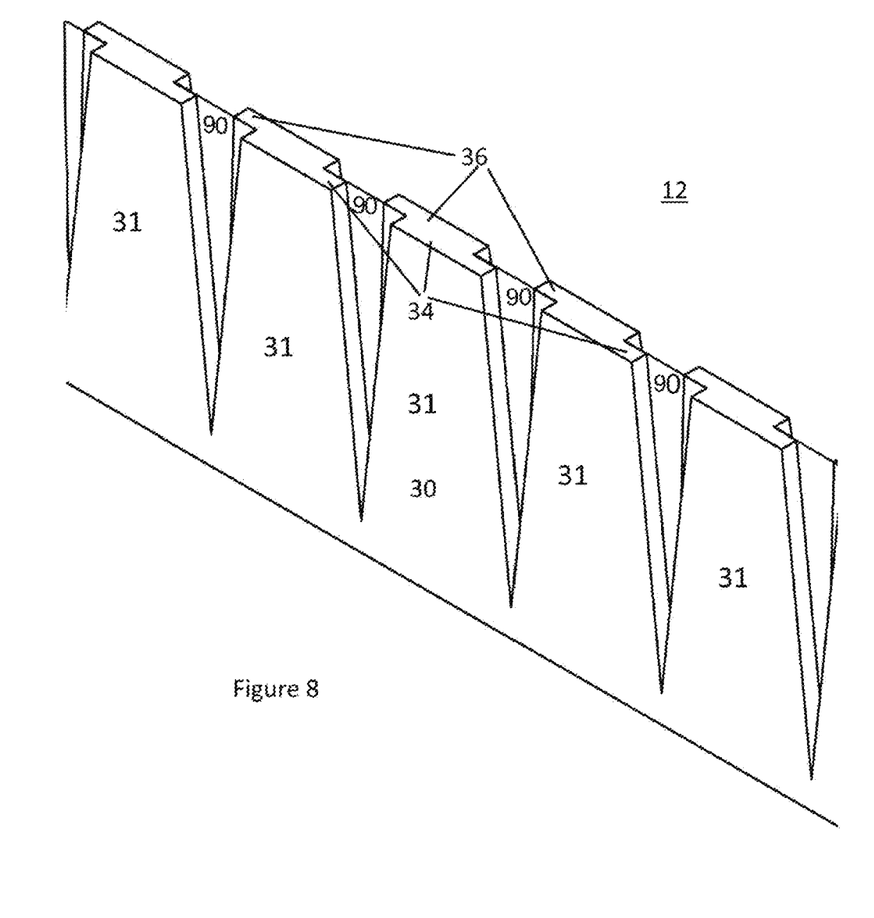
FIG. 8 illustrates a perspective view of a seal having front and rear gaps and a divider according to one or more embodiments disclosed herein.

Turning to FIG. 8, a divider 90 may be provided. The divider 90 may be unitarily formed as part of the sealing portion 30 or may be secured thereto. The divider 90 may be positioned between adjacent teeth 31 of the sealing portion 30, thereby covering what would be the gaps 32 of the sealing portion in FIG. 3 or the gaps, 35, 37 of the sealing portion in FIG. 4. The divider 90 may be positioned centrally along the sealing portion 30, may be biased towards the front or rear of the sealing portion 30, or may be positioned on the front or rear edge of the sealing portion 30. FIG. 8 depicts a divider 90 positioned centrally between the front half 34 and the rear half 36 and extending between an adjacent front half 34 of a tooth 31 and a rear half 36 of a tooth 31. In other embodiments, the divider 90 may extend between front halves 34 or rear halves 36. The divider 90 may have a smaller thickness than the thickness 88 of the teeth 31 of the sealing portion 30. As the sealing portion 30 is bent, and the teeth 31 are forced closer together, the small thickness of the divider 90 may permit the divider 90 to fold and bend accordingly, similar to an accordion's action. The sealing portion 30 may therefore form a gapless barrier when engaged with a clamp assembly 14 and when shaped in conformance to a bend and/or a trough angle 2 of the conveyor belt 1.

Figure 7:
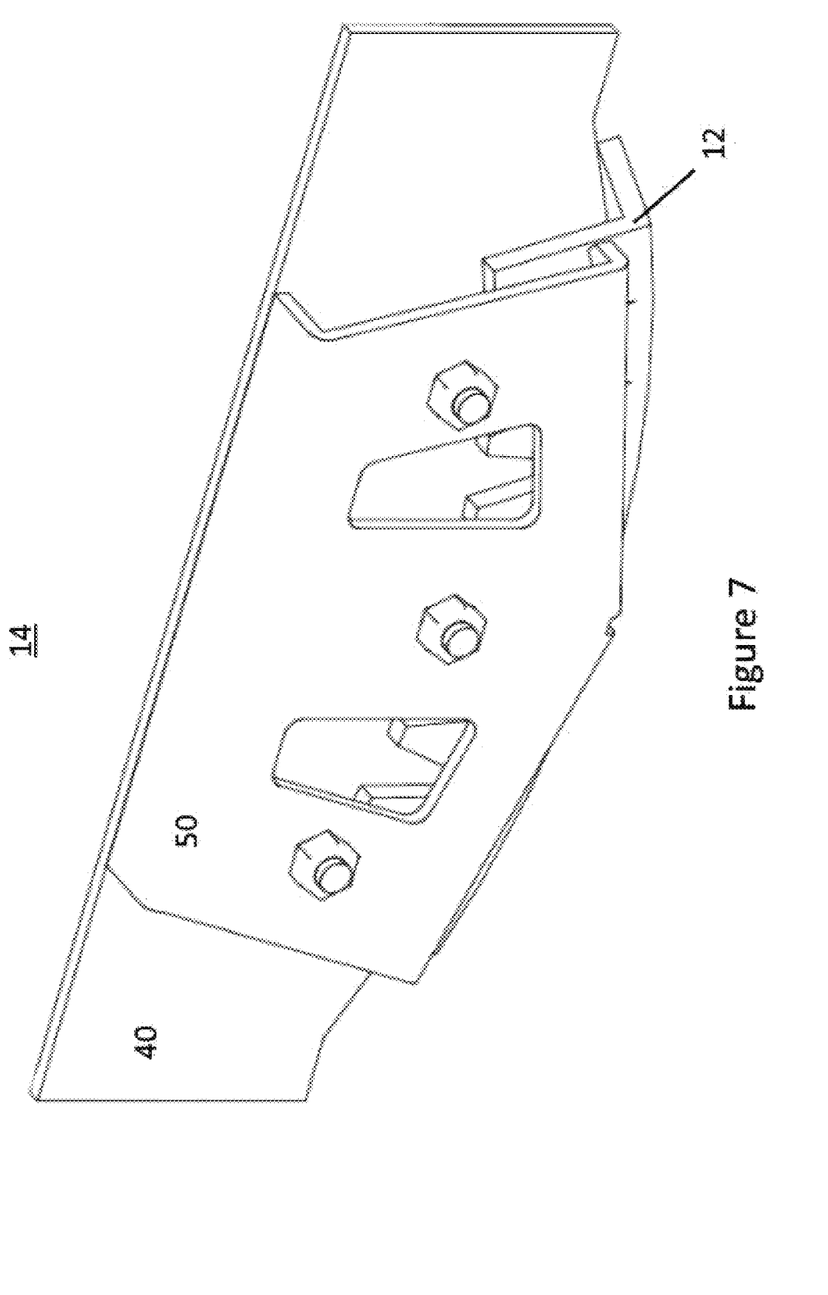
FIG. 7 illustrates a perspective view of a clamping assembly engaging a seal of a conveyor tail system according to one or more embodiments disclosed herein.

FIG. 7 illustrates the clamp assembly 14 having a support plate 40 and a compression plate 50 according to at least one embodiment of the present invention. The support plate 40 may be secured above the conveyor belt 1 for securing the conveyor tail system 10 above the conveyor belt 1. For example, the support plate 40 may be secured to a vertical chute 3 feeding the conveyor belt 1. The support plate may be substantially flat and/or define an arcuate edge 42 facing the conveyor belt 1 for selectively engaging the sealing portion 30 of the seal 12. The arcuate edge 42 may be shaped to conform to the shape of the bend and/or trough angle 2 of the conveyor belt 1.

Figure 5:
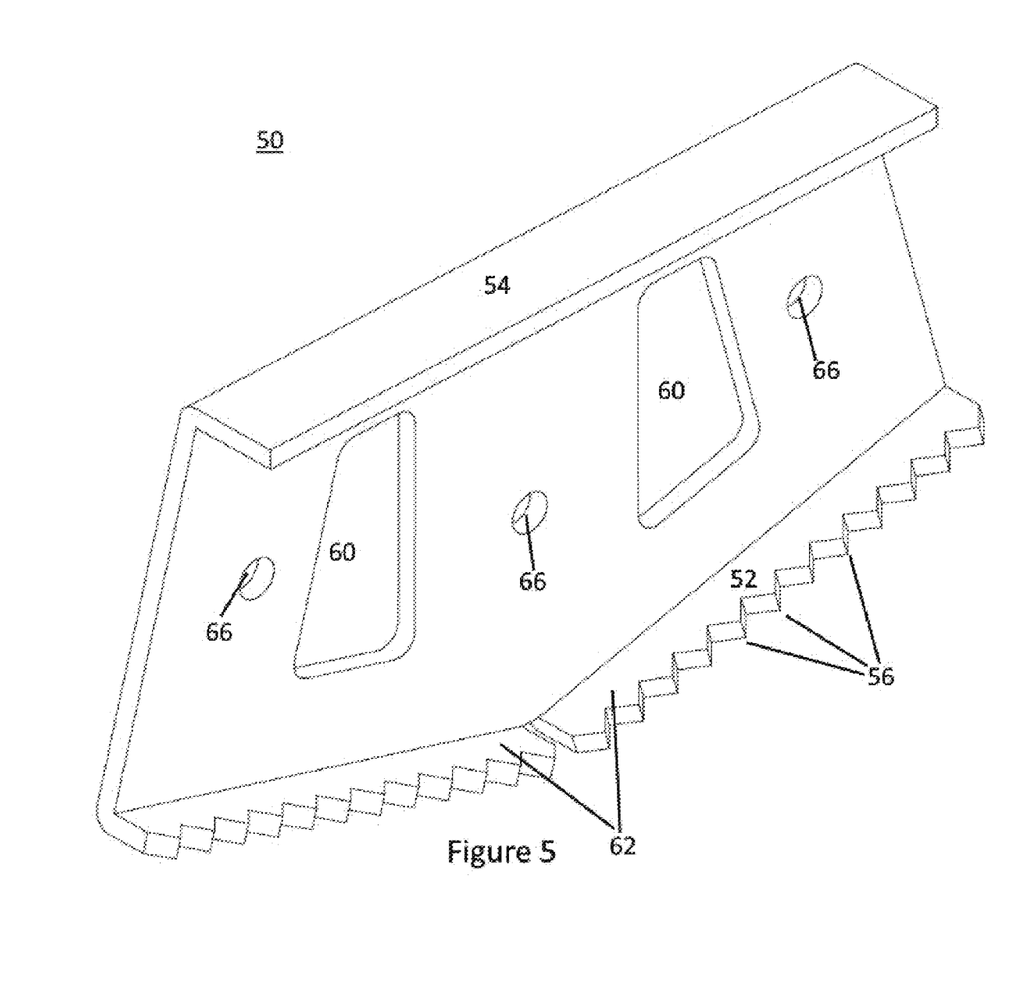
FIG. 5 illustrates a perspective view of a support plate of a clamping assembly according to one or more embodiments disclosed herein.

As depicted in FIG. 5, the clamp assembly 14 may further include a compression plate 50 configured for selective coupling with the support plate 40. In at least one embodiment, the support plate 40 may include fasteners 64 extending therefrom for selective engagement with the compression plate 50. For example, as depicted in FIG. 7, the fasteners 64 may be bolts which extend through and/or engage apertures 66 defined by the compression plate 50 and accept a nut thereon for coupling the compression plate 50 to the support plate 40. Selective engagement of the compression plate 50 to the support plate 40 may further involve selectively engaging the sealing portion 30 of the seal 12 therebetween.

In at least one embodiment, the compression plate 50 may define a spacer portion 54 extending therefrom for engaging the support plate 40 when the sealing portion 30 of the seal 12 is selectively engaged. For example, the spacer portion 54 may extend from a side of the compression plate 50 distal from the conveyor belt 1, such as a topmost side, for engaging the support plate 40 and/or the vertical chute 3. The spacer portion 54 may also serve to ensure that the compression plate 50 remains approximately parallel to the support plate 40, thereby ensuring that the engagement of the seal 12 by the compression plate 50 is correctly aligned.

Figure 6:
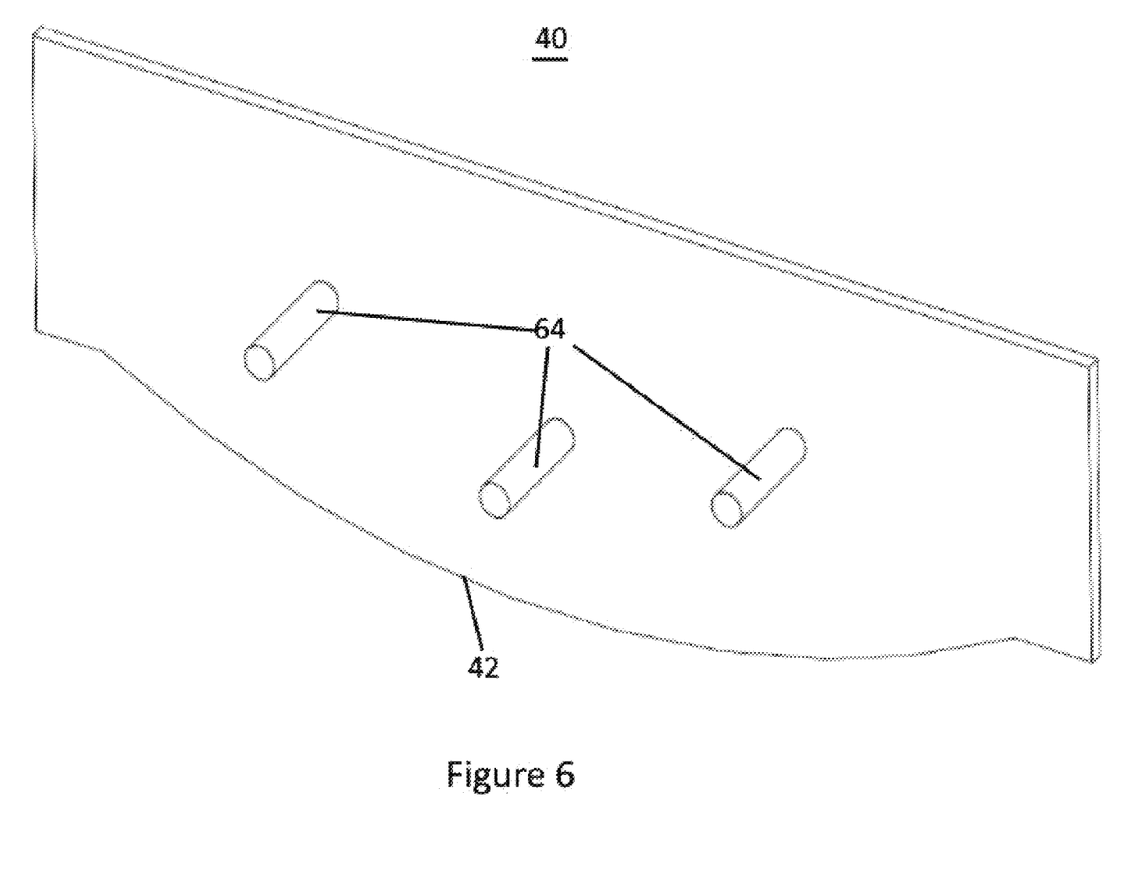
FIG. 6 illustrates a perspective view of a compression plate according to one or more embodiments disclosed herein.

As is depicted in FIG. 6, a clamp portion 52 may be defined by the compression plate 50. The clamp portion 52 may extend from a side of the compression plate 50 proximal to the conveyor belt 1, such as the bottommost side. The clamp portion 52 may define a plurality of teeth 56 for selectively engaging the sealing portion 30 of the seal 12 between the compression plate 50 and the support plate 40. Further, the clamp portion 52 may include at least two distinct sections 62. For example, the clamp portion 52 may be shaped like a triangle and include a section 62 for each of two of the three triangle sides. Alternatively, the clamp portion 52 may have an arcuate shape or being otherwise shaped to conform to the shape of the support plate 40.

In some embodiments, the compression plate 50 of the clamp assembly 14 may define at least one access hole 60 therethough for maneuvering the compression plate 50 and/or seal 12 engaged thereto. As one skilled in the art would appreciate, the access hole 60 may be any number of shapes and sizes and may positioned at any number of locations on the compression plate 50.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

The invention claimed is:

1. A conveyor tail system for minimizing spillage from a conveyor belt comprising:
 a clamp assembly including:
  a support plate for securing the conveyor tail system above the conveyor belt; and
  a compression plate for selective coupling with the support plate, the compression plate defining at least one access hole therethrough;
 a seal spanning a width of the conveyor belt for creating a barrier between the support plate and the conveyor belt, the seal defining:
  a runner portion defining a distal end capable of engagement with the conveyor belt and a proximal end positioned a distance above the conveyor belt; and
  a sealing portion selectively engageable between the support plate and teeth of a clamp portion defined by the compression plate, the sealing portion coupled at an obtuse angle to the proximal end of the runner portion, the sealing portion defining at least one triangular gap capable of closing in conformity with a trough angle of the conveyor belt,
 wherein the support plate defines an arcuate edge facing the conveyor belt for securing the seal in position above the conveyor belt.

2. The conveyor tail system of claim 1, further including a divider extending across the at least one triangular gap for forming a gapless barrier.

3. The conveyor tail system of claim 1, wherein a thickness of a distal end of the runner portion is greater than a thickness of a proximal end of the runner portion.

4. The conveyor tail system of claim 1, wherein support plate includes fasteners extending therefrom for selective engagement with apertures defined by the compression plate.

5. The conveyor tail system of claim 1, wherein the clamp assembly is metallic and the seal is elastomeric.

6. The conveyor tail system of claim 1, wherein the compression plate defines a spacer portion extending therefrom for engaging the support plate when the sealing portion of the seal is selectively engaged.

7. The conveyor tail system of claim 1, wherein the clamp portion extends from a bottom side of the compression plate and defines teeth for selectively engaging the sealing portion of the seal.

8. The conveyor tail system of claim 7, wherein the clamp portion includes at least two distinct sections.

9. The conveyor tail system of claim 7, wherein the clamp portion is shaped to conform to the shape of the support plate.

10. The conveyor tail system of claim 2:
 wherein the sealing portion defines a front half defining at least one triangular front gap and a rear half defining at least one triangular rear gap, and
 wherein the sealing portion forms a gapless barrier when engaged between the support plate and the clamp portion of the clamp assembly and shaped in conformance with a bend and/or a trough angle of the conveyor belt.

11. A conveyor tail system for minimizing spillage from a conveyor belt comprising:
 a clamp assembly for securing the conveyor tail system above the conveyor belt, wherein the clamp assembly includes:
  a support plate defining an arcuate edge facing the conveyor belt for securing a seal in position above the conveyor belt; and
  a compression plate defining at least one access hole therethrough for maneuvering the compression plate and/or the seal, wherein the compression plate defines a spacer portion extending therefrom for engaging the support plate when the sealing portion is selectively engaged; and the seal defining:

a runner portion extending along a width of the conveyor belt, the runner portion defining a distal end capable of engagement with the conveyor belt and a proximal end positioned a distance above the conveyor belt; and a sealing portion positioned at an obtuse angle relative to the runner portion, the sealing portion defining at least one triangular gap for being shaped in conformance to a bend and/or a trough angle of the conveyor belt, wherein the sealing portion of the seal is selectively engageable between the support plate and teeth of a clamp portion defined by a bottom side of the compression plate.

12. The conveyor tail system of claim 11:

wherein the sealing portion defines a front half defining at least one triangular front gap and a rear half defining at least one triangular rear gap, and wherein the sealing portion forms a gapless barrier when engaged between the support plate and the clamp portion of the clamp assembly in conformance with a bend and/or a trough angle of the conveyor belt.

13. The conveyor tail system of claim 11, further including a divider extending across the at least one triangular gap for forming a gapless barrier.

14. A conveyor tail system comprising:

a clamp assembly for securing the conveyor tail system above the conveyor belt, the clamp assembly including a support plate defining an arcuate edge facing the conveyor belt for securing a seal in position above the conveyor belt; and the seal defining:

a runner portion extending along a width of the conveyor belt, the runner portion defining a distal end capable of engagement with the conveyor belt and a proximal end positioned a distance above the conveyor belt; and a sealing portion extending from the proximal end of the runner portion at an obtuse angle, the sealing portion defining at least one triangular gap capable of closing in conformity with a trough angle of the conveyor belt, wherein the sealing portion is selectively engageable with the clamp assembly.

15. The conveyor tail system of claim 14, wherein the sealing portion defines at least one triangular gap for permitting the seal to be shaped in conformance to a bend and/or a trough angle of the conveyor belt.

16. The conveyor tail system of claim 15, further including a divider extending across the at least one triangular gap for forming a gapless barrier.

17. The conveyor tail system of claim 14, wherein an angle between the sealing portion and the runner portion is obtuse.

18. The conveyor tail system of claim 14, wherein the compression plate defines at least one access hole therethrough for maneuvering the compression plate and/or the seal.

19. The conveyor tail system of claim 14, wherein the compression plate defines a spacer portion extending therefrom for engaging the support plate when the sealing portion of the seal is selectively engaged.

20. The conveyor tail system of claim 14, wherein the clamp portion extends from a bottom side of the compression plate and defines teeth for selectively engaging the sealing portion of the seal.

* * * * *